Oct. 13, 1942.  C. W. MOTT  2,298,540
TRACTOR CULTIVATOR
Original Filed April 20, 1940   3 Sheets-Sheet 1

Inventor
Carl W. Mott
By Paul O. Pippel
Atty.

Oct. 13, 1942.  C. W. MOTT  2,298,540
TRACTOR CULTIVATOR
Original Filed April 20, 1940   3 Sheets-Sheet 2

Inventor
Carl W. Mott
By Paul O. Pippel
Atty

Patented Oct. 13, 1942

2,298,540

UNITED STATES PATENT OFFICE 2,298,540

TRACTOR CULTIVATOR

Carl W. Mott, La Grange, Ill., assignor to International Harvester Company, a corporation of New Jersey Continuation of application Serial No. 330,740, April 20, 1940. This application October 18, 1941, Serial No. 415,850

25 Claims. (Cl. 97—50)

This application is a continuation of my copending application Serial No. 330,740, filed April 20, 1940.

This invention relates to a device for applying pressure on earth-working tools such as cultivator rigs and the like.

Heretofore, earth-working tools, for example cultivator rigs, have been made of heavy stock which provided enough weight to hold the rigs in the ground during the cultivating operation. These heavy rigs are not desirable because; first, it is difficult to raise and lower them; and second, under some conditions the weight is not sufficient to cause the shovels provided on the rigs to penetrate the soil.

It is, however, desirable to construct the cultivator rigs as light in weight as possible, and desirable to provide a yieldable means for urging the shovels on the rigs into the ground. While many yieldable means for earth-working tools have been provided, none of them is practicable, since it is necessary that the yieldable means be stretched unduly when the tools are either raised or lowered.

Therefore, it is an object of the present invention to provide a pressure device which will not hinder the raising and lowering of the earth-working tools.

Another object of the invention is to provide a yieldable means for urging the earth-working tools into the ground.

By the present invention, the device for applying pressure on earth-working tools comprises a spring, one end of which is connected to the implement frame, and the other end of which is movably associated with the pivotally mounted tools in such a manner that, when the tools are lowered, the spring will move away from the pivot of the tools and urge the tools into the ground, and, when the tools are raised, the spring will move toward the pivot of the tools and not resist the raising thereof.

Other objects, advantages, and applications of the present invention will become apparent to those skilled in the art, when viewed in the light of the following description of an embodiment of the invention illustrated in the accompanying drawings, in which.

Figure 1:
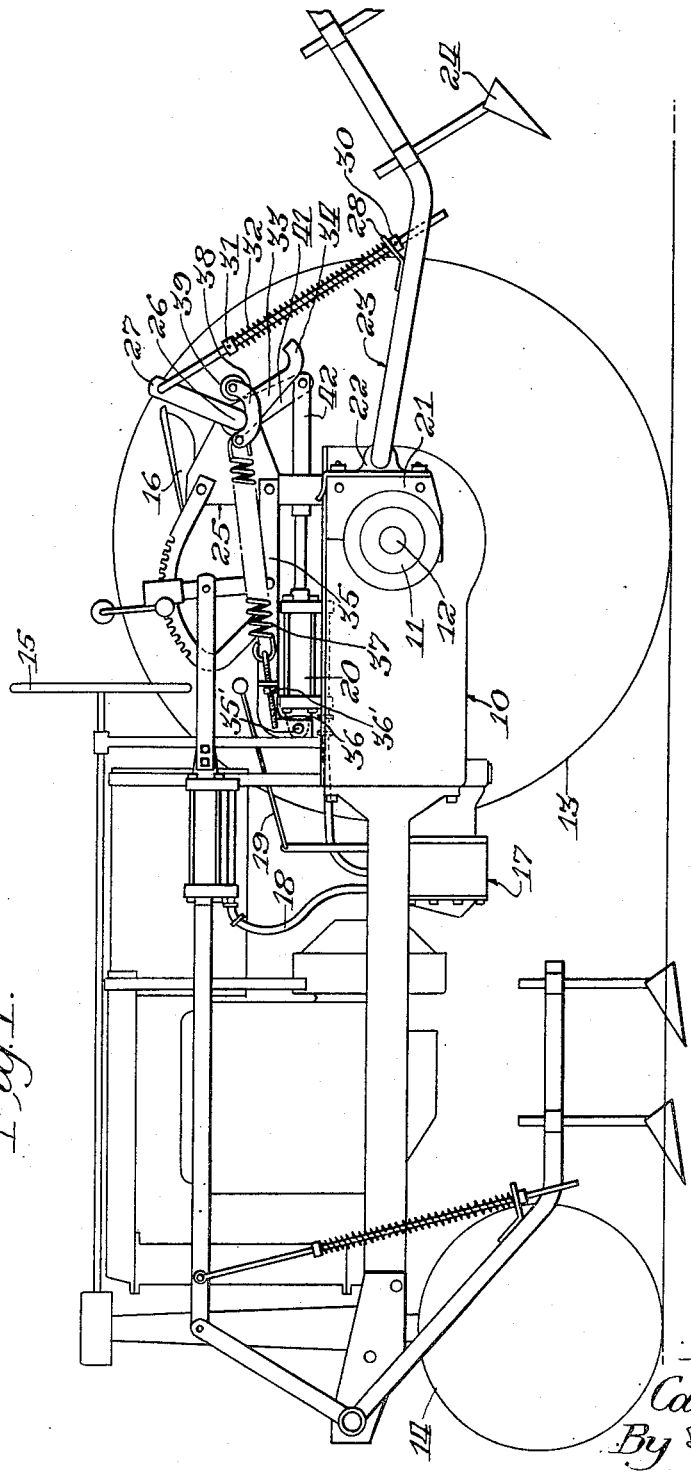
Figure 1 is a side view of the invention as applied to a tractor-mounted cultivator, showing the earth-working tools of the cultivator in a raised position.

In the present instance, the invention has been disclosed in connection with a tractor which has the usual body portion 10 at the rear of which extend axle housings 11 and axles 12. Wheels 13 are adjustably secured on the axles 12. The front end of the body portion 10 is supported on steerable front wheels 14 which are controlled by a steering wheel 15 near an operator's station 16 at the rear of the body 10.

The tractor has provided in the body portion 10, a power lift part 17 of a power lift means. Since the power lift per se forms no part of the present invention, it is believed that it is sufficient to say that the power lift is of the fluid-operated type, and has connections 18 extending therefrom that are connected to fluid lifting cylinder devices 20. The power lift part 17 has a pump and valve mechanism which is controlled by a lever 19 positioned near the operator's station 16.

The rear axle housings 11 are provided with plate members 21 to which are bolted quick attachable brackets 22 in which a cultivator implement or rig 23 is pivotally mounted. The rig 23 has secured thereon the usual earth-working tools 24.

Adjacent the plate members 21 are bolted bracket members 25 in which a rock-shaft 26 is rotatably mounted, on which a lifting linkage is mounted. The rock-shaft 26 is provided with arms 27 which are connected to brackets 28 on the rigs 23 by means of lifting rods 29. Collars 30 are secured on the rods 29 and contact the brackets 28, and collars 31 also adjustably secured on the rods 29 are adjustable against a first pressure spring 32 which encircles the rod. By adjusting the collar 31 on the rod 28, the pressure on the spring 32 can be increased or decreased as desired.

On the rock-shaft 26 is provided an arm 33 which has an arcuate end portion 34. A bar 35 extends forwardly of the bracket 25 and has adjustably secured at the end thereof by means of a bolt 36 and nut 36', a second spring 37 of a greater effective force than the first spring 32, the entire arrangement forming a biasing means for holding the tools 24 in the ground. The spring 37 extends toward the rock-shaft 26 and is connected between the ends of a pair of links 38. The other ends of the links have rotatably mounted therebetween a roller 39 which is movably associated with the arm 33.

The rock-shaft 26 also has an arm 41 extending therefrom to which a sleeve 42 is connected. One end of the fluid cylinder device 20 is inserted in the sleeve 42, and the other end of the device 20 is connected to a forwardly extending bar 35 by means of a pin 35'. When the lever 19 of the power lift part 17 is actuated, fluid is delivered through the connection 19 into the fluid cylinder device 20 which moves the rock-shaft 26 in a counter-clockwise direction. The arms 27 on the rock-shaft also move in a counter-clockwise direction and, through the lifting rods 29, to lift the cultivator rigs 23 about their pivotal connections to the brackets 22. When the control member 19 is again operated and the fluid in the fluid device 20 is released, the rock-shaft 26 is rotated in a clockwise direction and the rigs are lowered with the aid of spring 37, which is effective to maintain the arm 27 in a fixed position to provide an abutment for the first spring 32. The spring 37 will likewise tend to collapse the fluid device 20 to force the fluid out of the same.

Figure 2:
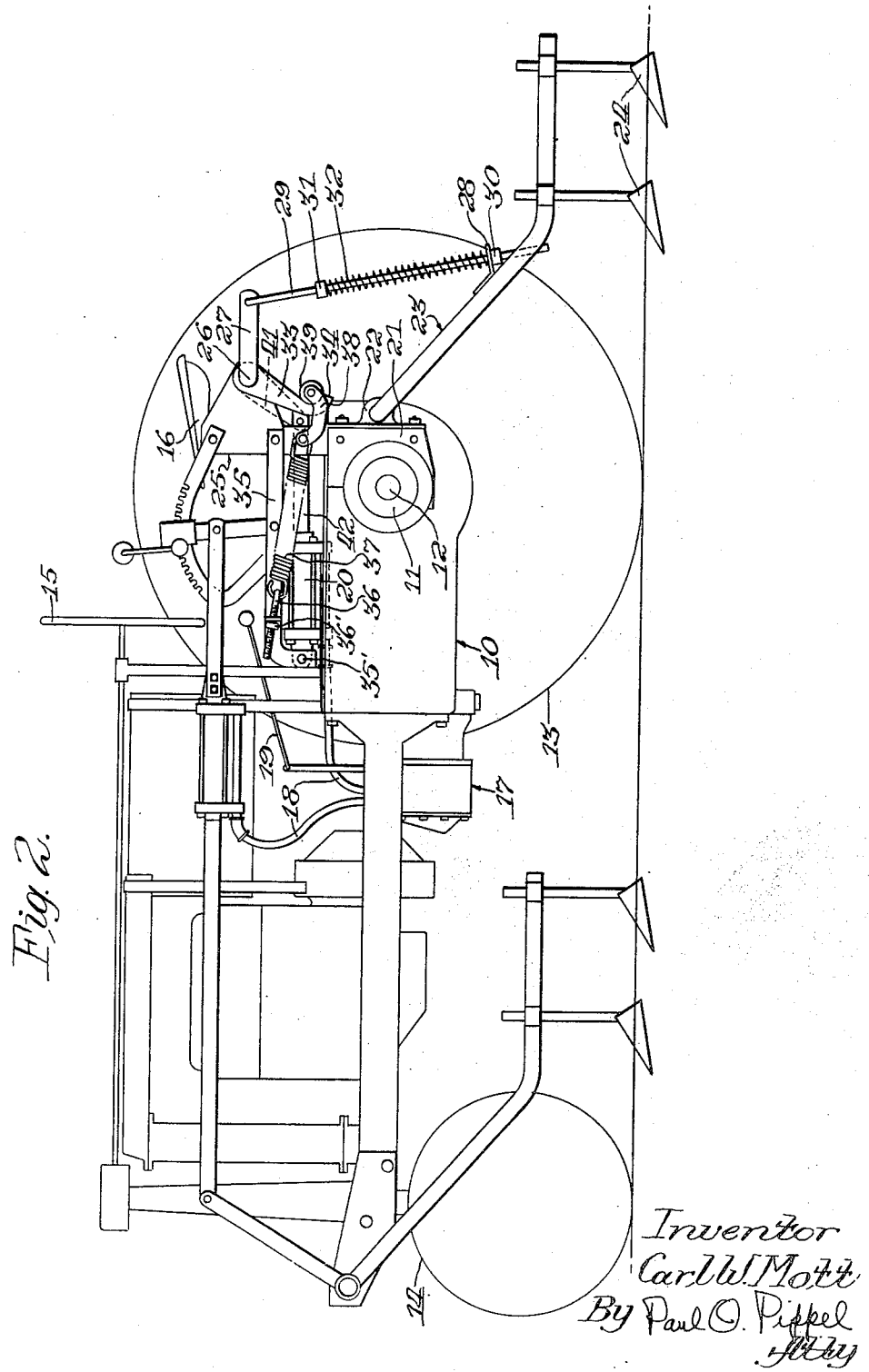
Figure 2 is a side view of the tractor-mounted cultivator, showing the earth-working tools of the cultivator in a lowered position; and, Figure 3 is a plan view of the structure shown in Figure 2.
Figure 3:
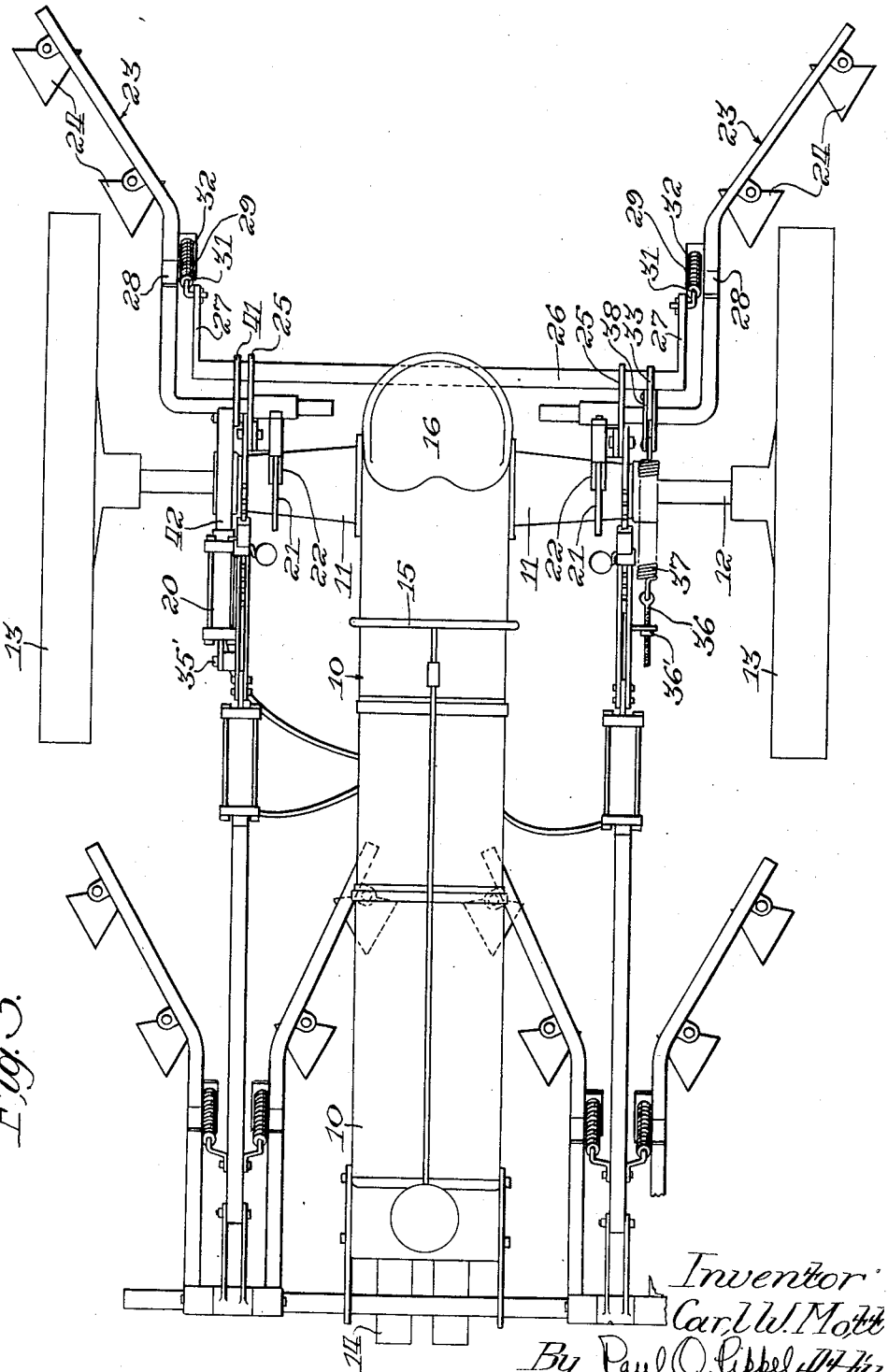

As shown in Figure 2, the rigs are in their operating position in the ground and it will be obvious that the forward travel of the machine will tend to move the rigs out of the ground and consequently move the rock-shaft, by means of the lifting rod 29 and spring 32, in a counter-clockwise direction. The rigs are prevented from coming out of the ground, however, by means of the spring 37 which maintains the arm 27 in a fixed position, as shown in Figure 2. The arm 33 on the rock-shaft 26 is urged to rotate in a clockwise direction by virtue of the spring 37, and the roller 39, connected to the spring 37 by links 38, rolls down the arm 33 into engagement with the arcuate end portion 34. The tension on the spring 37 thereby exerts a force in a clockwise direction on the rock-shaft 26. The rod 29, connected to the arm 27 on the rock-shaft 26, transmits this force to the rigs 23 through the spring 32, and the rigs are thus prevented from coming out of the ground. The rigs can move out of the ground against the tension of the first spring 32 provided on the lifting rod 29, but the collar 31 may be adjusted against the spring 32 to exert a greater force on the rig 23. Referring now to Figure 1, the rigs are shown in their raised position. The arm 33 on the rock-shaft 26 has moved in a counter-clockwise direction, and the roller 39 has rolled along the arm 33 toward the rock-shaft 26. It is to be noted that, when the rigs are raised, the roller rolls down the arm 33 toward the center of the rock-shaft and in no way hinders the lifting of the rigs 23, and thus the effective holding power of the biasing means will be greatly diminished. The biasing means in this way is automatically released when the rigs are raised.

From the foregoing description, it is obvious that a novel pressure device for applying pressure on earth-working tools has been provided. A constant yieldable pressure is applied on the rigs 23 by the spring 37 when the rigs are in a lowered position, and the rigs can be easily raised or adjusted, since at this time the spring 37 moves toward the center of the rock-shaft 26 to a neutral position.

What is claimed is:

1. In combination, a tractor having a rear axle housing, cultivator rigs pivotally connected to the rear axle housing, a rock-shaft journaled on the tractor, links connected to the rock-shaft and the cultivator rigs, power lift means on the tractor connected to the rock-shaft for raising and lowering the cultivator rigs about their pivotal connection to the rear axle housing, an arm having an arcuate end portion secured to the rock-shaft, a spring, one end of the spring connected to the tractor and the other end of the spring in rolling engagement with the arm on the rock-shaft, whereby when the power lift means lowers the cultivator rigs the end of the spring in rolling engagement with the arm will roll into the arcuate portion of the arm and hold the rigs in their lowered position, and when the power lift means raises the cultivator rigs the end of the spring in rolling engagement with the arm will roll to a neutral position on said arm on the rock-shaft.

2. In combination, a tractor having a rear axle housing, cultivator rigs pivotally connected to the rear axle housing, a rock-shaft journaled on the tractor, links connected to the rock-shaft and the cultivator rigs, power lift means on the tractor connected to the rock-shaft for raising and lowering the cultivator rigs about their pivotal connection to the rear axle housing, and means disposed between the tractor and the rock-shaft for holding the cultivator rigs in their lowered position and adapted to move to a neutral position when the cultivator rigs are raised.

3. In combination, a tractor having cultivator rigs mounted thereon, means on the tractor connected to the cultivator rigs for raising and lowering the rigs, and means connected to the tractor and movably associated with the cultivator rigs for holding the rigs in their operating position and adapted to move to a neutral position when the cultivator rigs are raised.

4. In combination, a tractor having cultivator rigs pivotally connected thereto, a rock-shaft having an arm journaled on the tractor, links connected to the rigs and the rock-shaft, means on the tractor for rotating the rock-shaft to effect raising and lowering of the cultivator rigs, and yielding means connected to the tractor and in engagement with the arm on the rock-shaft, whereby when the rock-shaft is rotated in a clockwise direction the yielding means will hold the rock-shaft against rotation in a counter-clockwise direction and when the rock-shaft is rotated in a counter-clockwise direction the yielding means will seek a neutral position on the arm of the rock-shaft.

5. In combination, a tractor having a rock-shaft journaled thereon, means on the tractor for rotating the rock-shaft in a clockwise direction and a counter-clockwise direction, and means connected to the tractor and associated with the rock-shaft for automatically holding the rock-shaft when rotated in one direction and automatically releasable to a neutral position when the rock-shaft is rotated in the other direction.

6. A tractor having a frame, cultivator rigs pivoted on the front and rear of the tractor frame, a rock-shaft journaled on the frame at the front and rear of the tractor, links connected to the cultivator rigs and to the rock-shafts, means for rotating the rock-shafts for effecting vertical adjustment of said rigs, an arm secured to said rock-shafts, a spring, one end of said spring connected to said tractor and the other end of said spring having rolling engagement with the arm on the rock-shaft, whereby when the rigs are lowered the rolling engagement end of the spring will ride on said arm and hold the shaft against rotation in the opposite direction to the tension of the spring, and when the rigs are raised the rolling engagement end of the spring will move on the arm on the rock-shaft and approach a neutral position on said arm.

7. A tractor having a frame, cultivator rigs pivoted on the tractor frame, a shaft journaled on the tractor, lifting rods connecting the rigs and the shaft on the frame, means for rotating said shaft for raising and lowering said rigs, an arm secured to said shaft, a spring, one end of said spring fixed on said tractor frame and the other end of said spring having rolling engagement with said arm on the rock-shaft, whereby when the rigs are raised to an operating position the spring will hold the rigs in the ground and when the rigs are raised the spring will seek a neutral position on said arm.

8. A tractor having a frame, cultivator rigs pivotally mounted on the frame, means mounted on the tractor and connected to the cultivator rigs for moving the rigs up and down about their pivotal connection to the frame, and means on said tractor associated with the cultivator rigs for exerting a force against said rigs when in their lowered position and automatically movable to a neutral position when said rigs are raised.

9. A tractor having a frame, cultivator rigs pivoted on the frame, means on said frame for moving the rigs about their pivotal connections to the frame, and means on the tractor frame associated with the rigs to automatically hold the rigs in their down position and automatically movable to a neutral position when the rigs are raised.

10. A tractor, cultivator rigs pivotally connected to the tractor for up and down movement with respect thereto, means on the tractor connected to the rigs for moving said rigs up and down, and spring means on the tractor associated with the rigs to automatically hold the rigs in their down position and automatically movable to a neutral position when the rigs are raised.

11. In combination, a frame, cultivator rigs pivotally mounted on the frame, means mounted on the frame and connected to said rigs for moving said rigs in two directions, and means on said frame associated with said rigs for forcing said rigs in one direction and movable to a neutral position when said rigs are moved in the other direction.

12. In combination, a frame, cultivator rigs pivotally mounted on the frame, means mounted on the frame and connected to said rigs for moving said rigs in two directions, and a spring connected to said frame and associated with said rigs for forcing the rigs in one direction and movable to a neutral position when the rigs are moved in the other direction.

13. In combination, a frame, cultivator rigs pivotally mounted on the frame, means mounted on the frame and connected to said rigs for moving said rigs in two directions, and a spring connected to said frame and movably associated with said rigs for rotating the rigs about their pivotal connection to the frame when the rigs are moved in one direction and releasable to a neutral position when said rigs are rotated in the other direction.

14. In combination, a frame, cultivator rigs pivotally mounted on the frame, a rock-shaft on said frame, means for rotating said rock-shaft in two directions, means connected between said rock-shaft and said rigs, and a spring connected to said frame and associated with said rock-shaft for urging the rock-shaft in one direction and movable to a neutral position when the rock-shaft is moved in the other direction.

15. In combination, a frame, cultivator rigs pivotally mounted on the frame, a rock-shaft on said frame, means for rotating said rock-shaft in two directions, means connected between said rock-shaft and said rigs, and a spring connected to said frame and in rolling engagement with said rock-shaft for urging said rock-shaft in one direction and movable to a neutral position when said rock-shaft is moved in the other direction.

16. In combination, a frame, cultivator rigs pivotally mounted on the frame, a rock-shaft on said frame, means for rotating said rock-shaft in two directions, means connected between said rock-shaft and said rigs, an arm on said rock-shaft having an arcuate end portion, a spring on said frame in rolling engagement with said arm whereby when the rigs are moved in one direction the spring will move into the arcuate end portion of the arm and when the rigs are moved in the other direction the spring will move to a neutral position on said arm.

17. In combination, a tractor, an implement mounted on the tractor for vertical movement to and from an operating position, means for lifting the implement, biasing means for normally holding the implement in its operating position, and said biasing means being arranged and constructed to move into a neutral position upon actuating the lifting means to lift the implement.

18. In combination, a tractor, an implement mounted on the tractor for vertical movement to and from its operating position, power lift means connected between the tractor and the implement to lift the same, biasing means between the tractor and implement to normally hold the implement in its operating position, and said biasing means being arranged and constructed to move into a neutral position upon actuating the power lift means to lift the implement.

19. In combination, a tractor, an implement mounted on the tractor for vertical movement to and from its ground-working position, power lift means including a fluid lifting cylinder device connected between the tractor and the implement to lift the implement, and spring means tending to collapse the cylinder and to hold the implement in its ground-working position, said spring means being connected to said cylinder device so that it becomes less effective upon operation of the cylinder device to lift the implement.

20. In combination, a tractor, an implement mounted on the tractor for movement to and from an operating position, power lift means including a fluid cylinder device connected between the tractor and the implement for moving the implement, a first spring means incorporated in the left means, and a second spring means connected to the tractor and the lift means independent of said first spring means for collapsing the fluid cylinder device.

21. In combination, a tractor, an implement mounted on the tractor for movement to and from an operating position, power lift means including a fluid cylinder device connected between the tractor and the implement for moving the implement, a first spring means incorporated in the lifting means for yieldingly holding the implement in its operating position, and a second spring means connected to the tractor and the lifting means independent of and having a greater effective force than said first spring means for collapsing the fluid cylinder device.

22. In combination, a tractor, an implement mounted on the tractor for movement to and from an operating position, power lift means including a fluid cylinder device and lifting linkage connected to the tractor and the implement for moving the implement, a first spring incorporated in the lifting linkage for yieldingly holding the implement in an operating position, a second spring of greater effective force than the first spring and connected to the tractor and to the lifting linkage, said second spring being effective to maintain the linkage in a fixed position to provide an abutment for the first spring when the implement is in an operating position.

23. In combination, a tractor, an implement mounted on the tractor for vertical movement to and from its ground-working position, means for lifting the implement including two relatively movable parts and a single-acting power means adapted to act through said parts, biasing means disposed between the two relatively movable parts tending to hold the same in collapsed relationship independently of the power means, and the biasing means being so connected to said parts that it becomes less effective upon operation of the power means.

24. In combination, a tractor, an implement mounted on the tractor for vertical movement to and from its ground-working position, a single-acting fluid device for moving the implement from its ground-working position to a position for transport, means for connecting the fluid device to the implement including a hold-down pressure spring means for holding the implement in its ground-working position, means for holding the fluid device collapsed to thereby render the hold-down pressure spring means operative, said latter holding means being releasable upon the pressure spring means at any time becoming ineffective.

25. In combination, a tractor, a plurality of implement rigs mounted on the tractor for independent vertical movement to and from their ground-working position, a single-acting fluid device for simultaneously moving the rigs from their ground-working positions to positions for transport, means for connecting the fluid device to the rigs including a hold-down pressure spring for each of the rigs for respectively holding the same in their ground-working positions, and master biasing means tending to hold the fluid device collapsed and to thereby render the pressure springs operative but being releasable upon the hold-down pressure springs at any time becoming ineffective.

CARL W. MOTT.